(12) United States Patent
Arakawa

(10) Patent No.: US 8,717,639 B2
(45) Date of Patent: May 6, 2014

(54) IMAGE PROCESSING FOR POSITION DEVIATION CORRECTION

(75) Inventor: Junya Arakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 502 days.

(21) Appl. No.: 13/012,611

(22) Filed: Jan. 24, 2011

(65) Prior Publication Data

US 2011/0216379 A1 Sep. 8, 2011

(30) Foreign Application Priority Data

Mar. 2, 2010 (JP) ................................. 2010-045679

(51) Int. Cl.
*H04N 1/04* (2006.01)
(52) U.S. Cl.
USPC .............. 358/488; 358/1.4; 358/1.5; 358/1.9; 358/1.12; 358/1.13; 358/474; 358/475; 358/406; 358/496; 358/497; 358/504; 358/2.1; 399/49; 399/301; 347/116
(58) Field of Classification Search
None
See application file for complete search history.

(56) References Cited

U.S. PATENT DOCUMENTS

| 5,765,083 | A | * | 6/1998 | Shinohara | 399/301 |
| 5,828,925 | A | * | 10/1998 | Yoshizawa | 399/39 |
| 7,777,896 | B2 | | 8/2010 | Ueda et al. | |
| 7,889,920 | B2 | | 2/2011 | Arakawa | 382/166 |
| 7,916,366 | B2 | * | 3/2011 | Utsunomiya | 358/518 |
| 8,111,415 | B2 | | 2/2012 | Maebashi | |
| 2004/0239746 | A1 | * | 12/2004 | Ozawa et al. | 347/116 |
| 2008/0218786 | A1 | * | 9/2008 | Maebashi | 358/1.12 |
| 2009/0142084 | A1 | * | 6/2009 | Nakahata | 399/51 |
| 2010/0097656 | A1 | | 4/2010 | Misawa et al. | 358/2.1 |

FOREIGN PATENT DOCUMENTS

| JP | 2004-170755 | | 6/2004 |
| JP | 2007-196621 | A | 8/2007 |
| JP | 2008-216813 | A | 9/2008 |
| JP | 2009-014869 | A | 1/2009 |

* cited by examiner

*Primary Examiner* — Miya J Cato
(74) *Attorney, Agent, or Firm* — Fitzpatrick, Cella, Harper & Scinto

(57) ABSTRACT

In an image forming apparatus for making a position deviation correction, a position deviation amount can be accurately calculated by stabilizing the detection result at position deviation detecting and considering an ideal correction amount and an actual correction amount to make the position deviation correction accurately. A forming unit forms a pattern for position deviation detection without making the position correction for less than one pixel by an image position correcting unit, to a pattern formed in the vicinity of a detection region of a detecting unit, and the position deviation amount is calculated by using a value of a position correction which is not made to the pattern for position deviation detection to be formed.

11 Claims, 14 Drawing Sheets

FIG.4A INCLINATION AMOUNT 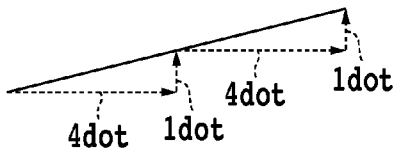
FIG.4B BIT MAP IMAGE (BEFORE CORRECTION) 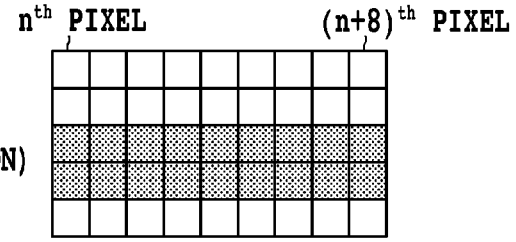
FIG.4C CORRECTION BIT MAP IMAGE 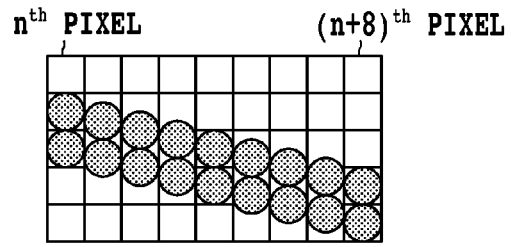
FIG.4D CORRECTION PARAMETER
| | $n^{th}$ PIXEL | | | | | | | | $(n+8)^{th}$ PIXEL |
|---|---|---|---|---|---|---|---|---|---|
| $\Delta y$ | 0 | 0.25 | 0.5 | 0.75 | 1 | 1.25 | 1.5 | 1.75 | 2 |
| $k$ | 0 | 0 | 0 | 0 | 1 | 1 | 1 | 1 | 2 |
| $\beta = \Delta y - k$ | 0 | 0.25 | 0.5 | 0.75 | 0 | 0.25 | 0.5 | 0.75 | 0 |
| $\alpha = 1 - \beta$ | 1 | 0.75 | 0.5 | 0.25 | 1 | 0.75 | 0.5 | 0.25 | 1 |
FIG.4E BIT MAP IMAGE (AFTER CORRECTION) 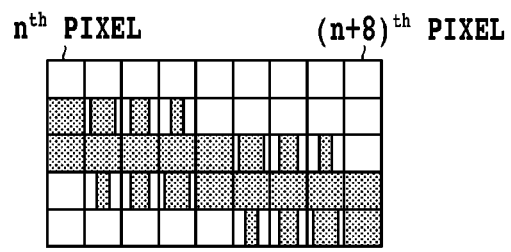
FIG.4F EXPOSURE IMAGE 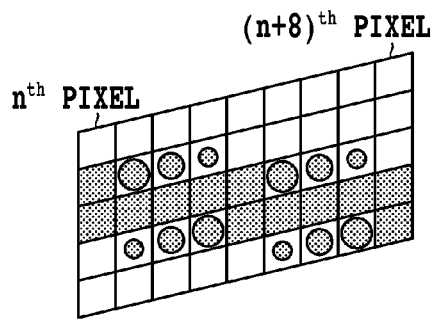

FIG.9A INCLINATION AMOUNT
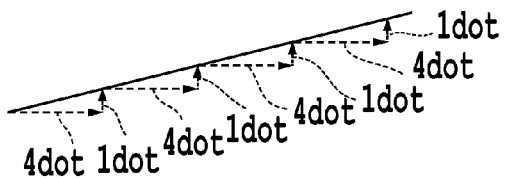
FIG.9B BIT MAP IMAGE (BEFORE CORRECTION)
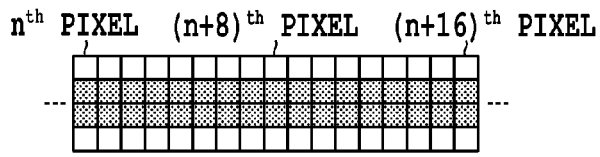
FIG.9C CORRECTION BIT MAP IMAGE
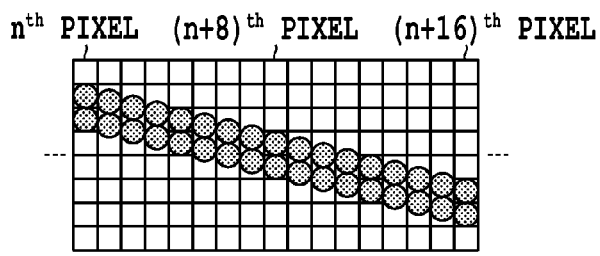
FIG.9D CORRECTION PARAMETER
| STEP RESTRICTION | $n^{th}$ PIXEL | | | | | | | ✓ | ✓ | ✓ | ✓ | | | | | | |
|---|---|---|---|---|---|---|---|---|---|---|---|---|---|---|---|---|---|
| Δy | --- | 0 | 0.25 | 0.5 | 0.75 | 1 | 1.25 | 1.5 | 1.75 | 2 | 2.25 | 2.5 | 2.75 | 3 | 3.25 | 3.5 | 3.75 | 4 | --- |
| k | --- | 0 | 0 | 0 | 0 | 1 | 1 | 1 | 1 | 2 | 2 | 2 | 3 | 3 | 3 | 3 | 4 | --- |
| k' | --- | 0 | 0 | 0 | 0 | 1 | 1 | 1 | 1 | 1 | 2 | 2 | 3 | 3 | 3 | 3 | 4 | --- |
FIG.9E BIT MAP IMAGE (AFTER CORRECTION)
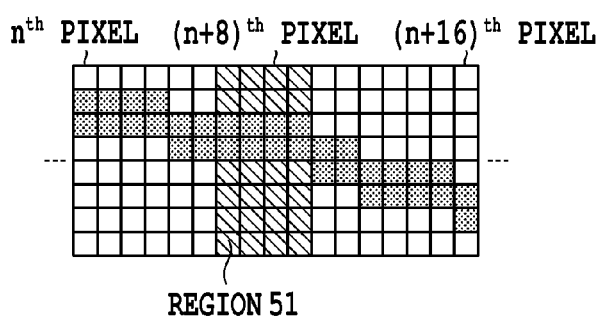
REGION 51
FIG.9F
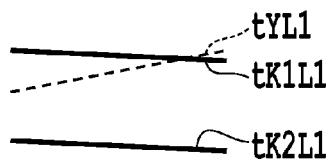
FIG.9G
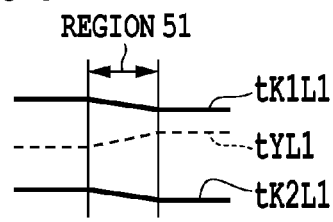

IMAGE PROCESSING FOR POSITION DEVIATION CORRECTION

BACKGROUND OF THE INVENTION

1. Field of the Invention

The present invention relates to an image forming apparatus for correcting a position deviation of an image to be formed.

2. Description of the Related Art

A position deviation (color deviation) is known as a problem in a color image forming apparatus of a tandem system. The tandem system is a system which is provided with developing machines and photosensitive elements each number of which is the same as the color number of the toner and sequentially transfers images in different colors onto a carrier belt or a print medium. The position deviation means the event that the image is made to be transferred in a position different from a position to be expected. A cause of the position deviation is unevenness or a mounting position deviation of a lens in a deflection scan apparatus, or an assembling position deviation of the deflection scan apparatus to a color image forming apparatus body. Caused by this position deviation, an inclination or a curve is generated in a scan line and a degree of the inclination or curve differs in each color, thus creating the position deviation (color deviation) of the image.

An example of the method for overcoming this problem includes a method in which magnitudes of an inclination and a curve in a scan line are measured by using an optical sensor and the bit map image data is corrected to cancel out the magnitudes, forming the corrected image (Japanese Patent Laid-Open No. 2004-170755).

In general, a color image forming apparatus forms a pattern for position deviation detection for each color on an image carrier such as a photosensitive element or an intermediate transfer element or on a transfer material carrier such as a carrier belt and detects the formed pattern by optical sensors located at both sides in the downstream portion. Further, correction of the position deviation is made based upon the detection result.

However, in a case where the pattern for position deviation detection is formed on the transfer material carrier by the position deviation correcting method using the process described in Japanese Patent Laid-Open No. 2004-170755, in some cases the detection accuracy of the pattern is deteriorated. Hereinafter, the reason for the deterioration of the detection accuracy will be explained.

In a case of finding a position deviation (color deviation) using a pattern for position deviation detection, a pattern configured by horizontal lines, inclined lines or the like is formed, a position of the line in the pattern is detected by a scan of an optical sensor on the line, and the position deviation is calculated based upon the detected position of the line. FIG. 11A shows an example of a pattern for position deviation detection to be formed on a transfer material carrier. K1 and K2 are patterns for position deviation detection formed in black, and Y is a pattern for position deviation detection formed in yellow. Respective detection timings of lines in the patterns K1, K2, and Y by the optical sensor are defined as t1, t2, and t3 and a conveying speed of an intermediate transfer element is defined as v. Then the position deviation in a sub scan direction between the black and yellow patterns can be found according to the formula of $\{t3-(t1+t2)/2\} \times v$. The position deviation in the sub scan direction means a deviation in an arrow direction (scan line direction of the optical sensor) of FIG. 11A. The patterns in this example are configured only by the black and yellow patterns, but a position deviation in a sub scan direction between similar patterns in other colors can be also found.

The detection timing of each line is found by a signal from the optical sensor. FIG. 11B shows horizontal lines formed as a part of the pattern for position deviation detection and a scan line of the optical sensor, and FIG. 11C expresses a signal from the optical sensor in a case of detecting the horizontal line in FIG. 11B along the scan line. As shown in FIG. 11C, timings where the signal and a threshold value (for example, threshold value of the density) intersect are defined as detection timings of edges in the line and the detection timings at both ends of the line are averaged, thus finding a detection timing of a center position of the line in a sub scan direction. The detection timing in the center position is defined as the detection timing of the line.

Here, in a case of detecting the pattern for position deviation detection to which the position deviation correction using the process described in Japanese Patent Laid-Open No. 2004-170755 is made, based upon the method as described above, there possibly occurs a problem that the detection accuracy is deteriorated. This problem will be explained with reference to FIGS. 12A and 12B.

FIG. 12A shows an image forming state in a case where the position deviation correction is made to the horizontal line, and FIG. 12B shows a detection signal in a case of detecting the line in FIG. 12A by the optical sensor. As shown in FIG. 12A, in a case where the position deviation correction is made, a pixel smaller than one pixel is used at an edge portion of the line in addition to the correction in a pixel unit. Details of the correction method are described in Japanese Patent Laid-Open No. 2004-170755.

Here, since it is generally difficult to stably form a small pixel due to the influence of the fluidity in a toner in an image forming apparatus of an electronic photography system, the edge portion of the line configured by the small pixel tends to be easily unstable.

In a case of forming the small pixel, when an optical amount at exposure is made small or exposure hours are shortened, a latent image is made shallow and therefore an applied amount of the toner is unstable. Therefore, as compared to an ideal detection signal shown in a dotted line in FIG. 12B, the edges of the line are detected to be deviated in an actual detection signal shown in a solid line. As a result, since the aforementioned center position of the line is also calculated to be deviated, the detection accuracy of the pattern for position deviation detection is deteriorated.

In addition, not limited to the aforementioned correction, for example, even in a case of making a correction in a pixel unit alone, caused by the correction a defect possibly occurs in the position deviation detection result. For example, that is a case where position deviation detection patterns to be formed overlap. In this way, in a case where a digital position deviation correction of correcting the image data itself is made in a sub scan direction, the defect occurs in the detection result of the pattern for position deviation detection.

SUMMARY OF THE INVENTION

The present invention forms a pattern for position deviation detection in such a manner as to be accurately detectable in an image forming apparatus for making a position deviation correction.

The present invention is provided with an image forming apparatus comprising an image position correcting unit for making a position correction of an image in a sub scan direction to image data, wherein the position correction includes a position correction for less than one pixel and a position correction in one pixel unit, an image forming unit for forming a pattern for position deviation detection as the image data to which the position correction is made, a detecting unit for detecting the formed pattern for position deviation detection, a position deviation amount calculating unit for calculating a position deviation amount of the image data based upon the detected pattern for position deviation detection, and a control unit for controlling the forming unit to form the pattern for position deviation detection without making the position correction of the image for less than one pixel by the image position correcting unit to a pattern formed in the vicinity of a detection region of the detecting unit and for controlling the position deviation amount calculating unit to calculate the position deviation amount using a value of the position correction which is not made to the formed pattern for position deviation detection.

According to the present invention, it is possible to improve calculation accuracy of the position deviation amount in the image forming apparatus for making the position deviation correction.

Further features of the present invention will become apparent from the following description of exemplary embodiments (with reference to the attached drawings).

BRIEF DESCRIPTION OF THE DRAWINGS

FIGS. 4A to 4F are diagrams explaining an embodiment of an image correction at the time of forming a normal image;

FIGS. 9A to 9E are diagrams explaining an embodiment of an image correction at the time of forming a detection pattern;

FIG. 9F is a diagram explaining a state of the pattern formation in a case smoothing processing of less than one pixel and offset processing in one pixel unit are not executed;

FIG. 9G is an example where the smoothing processing of less than one pixel is not executed and the offset processing in one pixel unit is executed to a region other than a step restricting region;

DESCRIPTION OF THE EMBODIMENTS

Hereinafter, the best mode of carrying out the present invention will be explained with reference to the accompanying drawings.

Figure 1:
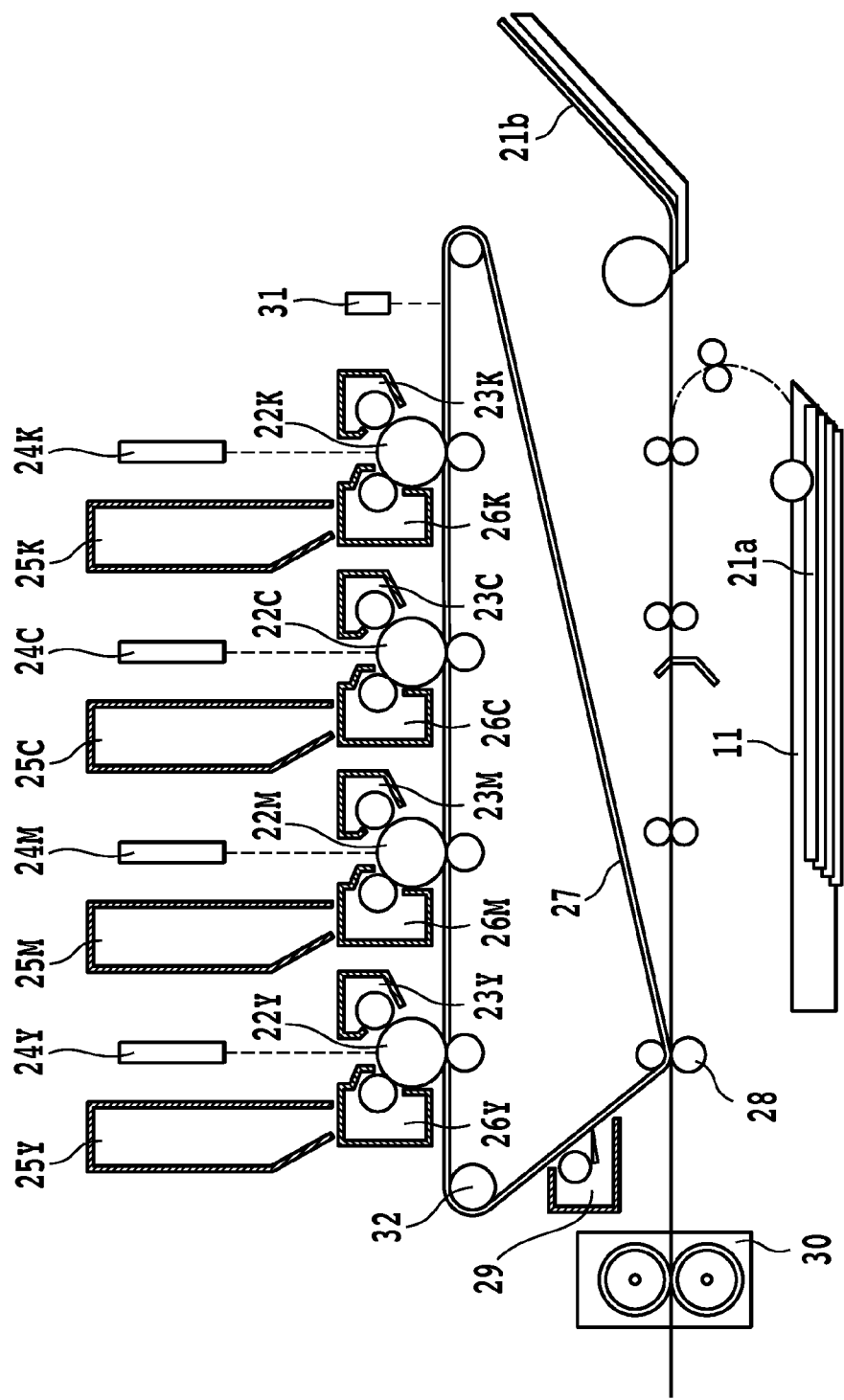
FIG. 1 is a cross section showing an embodiment of a color image forming apparatus.

FIG. 1 is a cross section showing an embodiment of a color image forming apparatus provided with image forming units for four colors, that is, yellow Y, magenta M, cyan C and black K. The image forming apparatus is formed of an image forming part shown in FIG. 1 and an image processing unit (not shown).

By referring to FIG. 1, an operation of the image forming part in the color image forming apparatus of the electronic photograph system will be explained. The color image forming apparatus in FIG. 1 forms an electrostatic latent image by exposure light which lights up based upon exposure hours converted by the image processing unit, and develops this electrostatic latent image to form a single-color toner image. Further, the color image forming apparatus sequentially overlaps these single-color toner images to form a multi-color toner image, which is transferred and fixed on a transfer material 11. The image forming consists of a paper feeding unit 21, photosensitive element drums (22y, 22M, 22C and 22K) and injection chargers (23Y, 23M, 23C and 23K). Further, the image forming part consists of scanner units (24Y, 24M, 24C and 24K), toner cartridges (25Y, 25M, 25C and 25K), developing machines (26Y, 26M, 26C and 26K), an intermediate transfer belt 27, transfer rollers 28, and a fixing unit 30.

The photosensitive element drums 22Y, 22M, 22C, and 22K are rotated by transmission of a drive force of a motor (not shown), and the motor rotates the photosensitive element drums 22Y, 22M, 22C, and 22K in a counterclockwise direction in response to an image forming operation. The injection chargers 23Y, 23M, 23C and 23K for charging the photosensitive element and the developing machines 26Y, 26M, 26C and 26K for performing the development are provided in the circumference of the photosensitive element drums 22Y, 22M, 22C, and 22K.

The intermediate transfer belt 27 rotates in a clockwise direction by rotation of an intermediate transfer belt drive roller 32 (hereinafter, called drive roller), and the intermediate transfer drive roller 32 rotates subjected to drive transmission from the motor (not shown).

At the time of image formation, first, after the rotating photosensitive element drums are charged by the injection chargers 23Y, 23M, 23C and 23K, the exposure is performed on a surface of the photosensitive element drum selectively from the scanner units 24Y, 24M, 24C and 24K to form an electrostatic latent image thereon. In addition, the latent image is developed by a toner with each of the developing machines 26Y, 26M, 26C and 26K to be formed as a visual image. The single-color toner image is made to overlap on the intermediate transfer belt 27 rotating in a clockwise direction followed by rotation of the photosensitive element drum to be sequentially transferred thereon. Thereafter, contact of the transfer roller 28 with the intermediate transfer belt 27 allows a multi-color toner image on the intermediate transfer belt 27 to be transferred on the transfer material 11 to be carried in such a manner as to be tightly held between the transfer rollers 28. Further, the transfer material 11 which has retained the multi-color toner image is subjected to heat and pressure by the fixing unit 30, thus fixing the toner on the transfer material 11. The transfer material 11 after the toner image is fixed thereon is thereafter discharged to a discharge tray (not shown) by a discharge roller (not shown). The toner which has left on the intermediate transfer belt 27 is cleansed by a cleaning unit 29, and the cleansed toner is stored in a cleaner vessel.

An image detecting unit 31 is formed of two image detecting sensors 31L and 31R (described in FIG. 5) provided at both sides of the intermediate transfer belt 27 and detects a position deviation amount of each color by the method described later.

Figure 2:
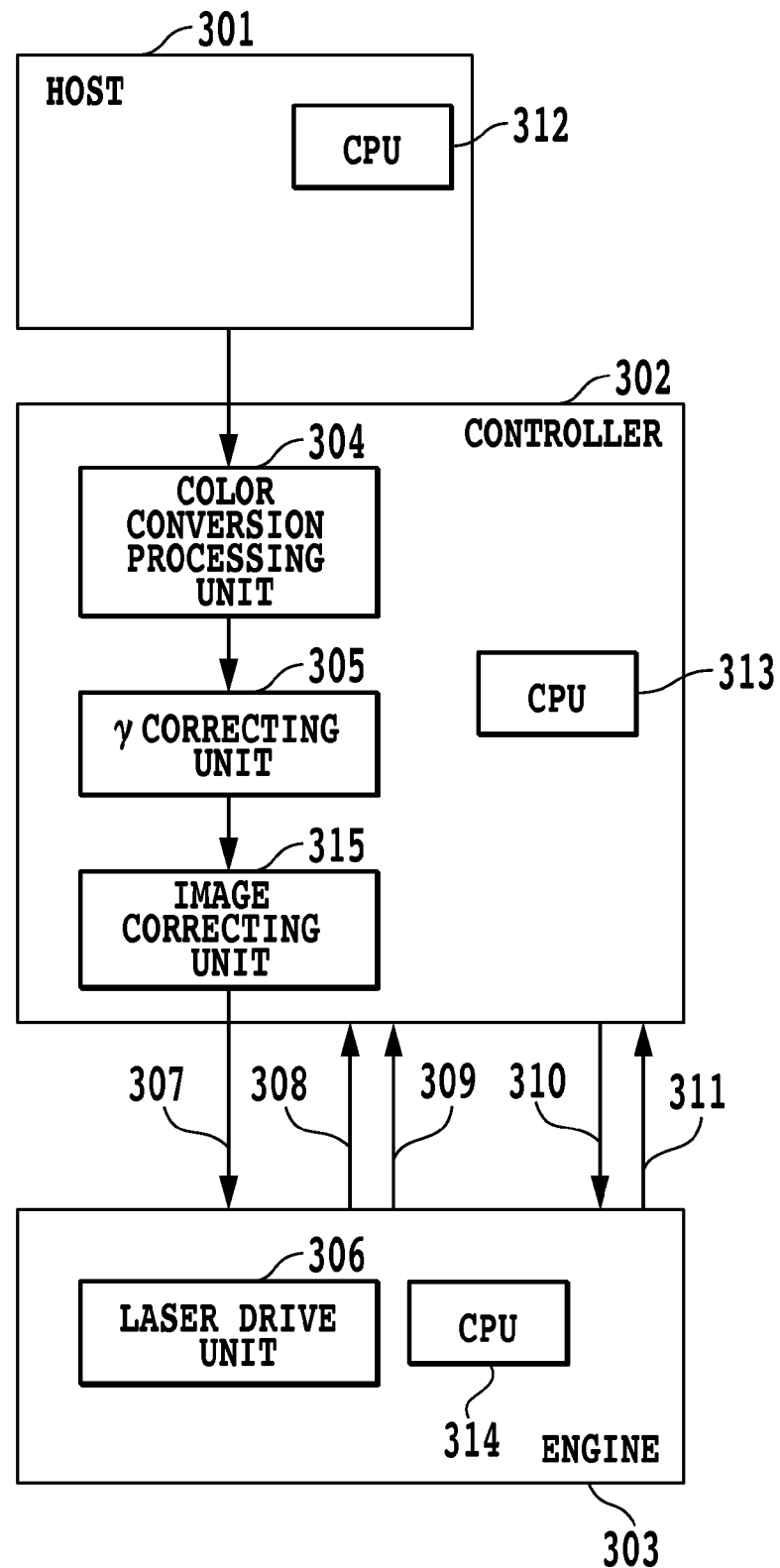
FIG. 2 is a functional block diagram of the color image forming apparatus and a diagram showing an embodiment of signal processing in the functional block diagram.

FIG. 2 is a functional block diagram of the color image forming apparatus and is a diagram showing an embodiment of signal processing of the functional block diagram.

In FIG. 2, each device of a host 301, a controller 302 and an engine 303 is provided with an independent main control unit (CPU 312, 313 or 314) for controlling each block in each device. Each CPU controls an operation in each device and communications between the respective devices. In the image forming apparatus in the present embodiment, a controller unit and an engine unit are designed to be separated from each other and each device is configured in a closed system such that the respective devices are individually controlled. The host 301 may be used as an information processing apparatus separated from the image forming apparatus.

Image signals of RGB are sent from the host 301 and are input to the controller 302, and the input RGB signals are subjected to masking and UCR (under color removal) processing in a color conversion processing unit 304. With the color correction and the underlayer removal, the RGB signals are converted into image signals of yellow Y, magenta M, cyan C and black K. In addition, correction is made to the image signal by a γ correcting unit 305 in such a manner that an output density curve is linear. Thereafter, in an image correcting unit 315, image data of each color is corrected for making an image position correction in a sub scan direction, and the corrected image data is input to the engine 303.

At 306 is denoted a laser drive unit, which performs laser lighting and light-out according to an image data signal 307 transmitted from the controller 302 to the engine 303. At 308 is denoted a horizontal synchronized signal transmitted from the engine 303 to the controller 302, at 309 is denoted a vertical synchronized signal transmitted from the engine 303 to the controller 302, and the image data is outputted from the controller 302 to the engine 303 in response to these synchronized signals. At 310 is denoted a various command transmission signal transmitted from the controller 302 to the engine 303, and at 311 is denoted a various status signal transmitted from the engine 303 to the controller 302.

Figure 3:
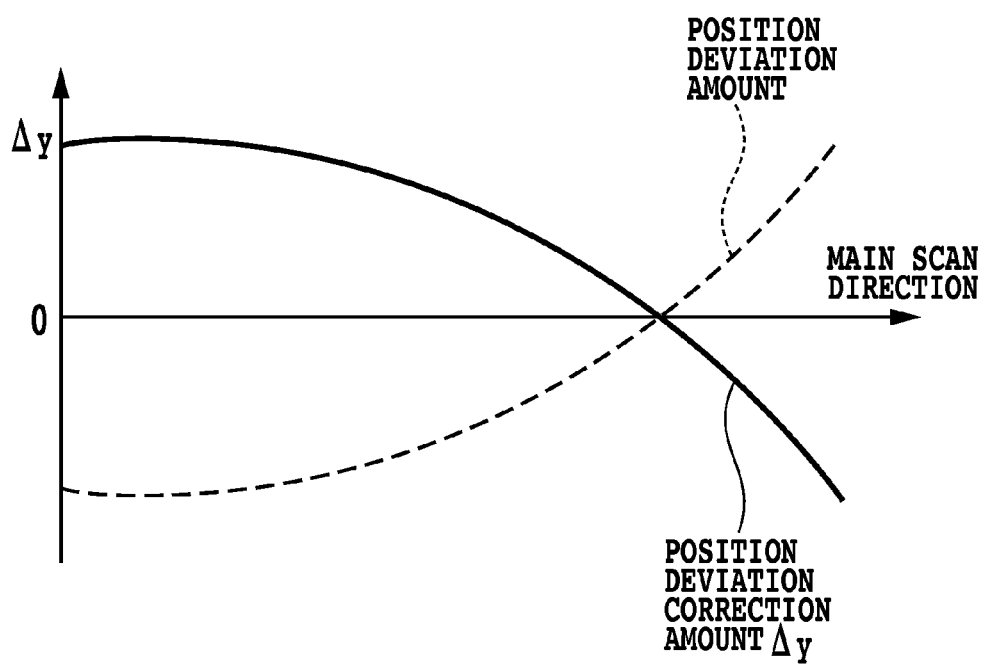
FIG. 3 is a diagram showing a relation between a position deviation amount and a position deviation correction amount Δy of an image in a sub scan direction to each position in a main scan direction in a case where a scan line is inclined or curved.

Next, a correcting method of the image data in the image correcting unit 315 will be explained. FIG. 3 is a diagram showing a relation between a position deviation amount and a position deviation correction amount Δy of an image in a sub scan direction to each position in a main scan direction in a case where a scan line is inclined or curved. The image is to be formed by correcting an image inclination or an image curve in accordance with this position deviation correction amount Δy. This position deviation correction amount Δy is a correction amount for canceling out the position deviation in a sub scan direction, and as shown in FIG. 3, the position deviation amount in a sub scan direction has a reverse relation to the position deviation correction amount Δy. For example, in the manufacturing process of the apparatus, a position deviation amount is measured for each apparatus, and a position deviation correction amount Δy is in advance found based upon the measured position deviation amount. It should be noted that there are some cases where even if the correction amount is in advance found, a deviation occurs in a different position due to heat or time-lapse factors such as resistance characteristics of a belt. In this case, a pattern for position deviation detection formed on an image carrier such as the intermediate transfer belt 27 is detected by the image detecting unit 31 as a position deviation detecting method described later, and the position deviation correction amount Δy can be calculated from the detection result. It should be noted that since the inclination or the curve of the scan line differs in each color (yellow Y, magenta M, cyan C, and black K), the image data of each color is subjected to correction different in accordance with the inclination or the curve of the scan line of each color.

FIGS. 4A to 4F are diagrams explaining that an image correction in a sub scan direction is made by making the image correction in the sub scan direction to image data in each position in a main scan direction at the time of forming a normal image. It should be noted that the normal image forming means not a case of forming a pattern for calibration described later (pattern for position deviation detection), but a case of image formation according to image data by a user's demand which is input from outside. That is, the normal image forming means a case of forming an image other than the pattern for position deviation detection. Hereinafter, an image correcting method will be explained with reference to FIGS. 4A to 4F by taking as an example a portion in which a position deviation of an image inclination rising toward the right side is generated. The image correcting method shown in FIGS. 4A to 4F is executed by the image correcting unit 315 explained in FIG. 2.

FIG. 4A shows an image of a scan line in a portion where a position deviation of an inclination rising toward the right side is generated. In this example, the inclination of one dot per four dots in a main scan direction of the scanner unit is generated. FIG. 4B shows a bit map image example in a horizontal straight line before tone value conversion and expresses a two-dot line. FIG. 4C shows a correction bit map image formed by correcting the bit map image in FIG. 4B for cancelling out the position deviation by the inclination of the scan line of FIG. 4A. The correction image in of FIG. 4C is an ideal correction bit map image, and is realized by adjusting a pixel value of each pixel in a digital correction process. FIG. 4D is a table showing a relation between a position deviation correction amount Δy to each pixel in a main scan direction of FIG. 4C and a tone value conversion parameter. The tone value conversion parameter is a parameter for making correction for less than one pixel. It should be noted that Δy in FIG. 4D corresponds to the position deviation correction amount Δy explained in FIG. 3. Here, k is an integral component (truncate fractions below decimal point) of the position deviation correction amount Δy and expresses a correction amount in one pixel unit in a sub scan direction. The image position correction in one pixel unit is to offset (correct coordinates) the pixel in a sub scan direction in one pixel unit in accordance with the correction amount.

β and α are image data adjustment distribution ratios (tone value conversion parameter) for making an image position correction for less than one pixel in a sub scan direction and express distribution ratios of the forward and backward pixel tone values in a sub scan direction by information below decimal point of the position deviation correction amount Δy. β and α are calculated according to the formulas of:

$$\beta = \Delta y - k \text{ and}$$

$$\alpha = 1 - \beta.$$

α is a distribution ratio in a position which is offset by a k-pixel amount in a sub scan direction from an original pixel. β is a distribution ratio in a position which is offset by a (k+1)-pixel amount in the sub scan direction from the original pixel. The tone value distributed according to the distribution ratios of α and β is added to the tone value in a position where each of the corrected bit map image is distributed.

Therefore, it is possible to express a pixel value of the corrected bit map image in the following form.

$$\text{processed\_value}(x,y) = \alpha \times \text{value}(x, y-k) + \beta \times \text{value}(x, y-(k+1))$$

Herein, value (x, y) shows a pixel value in a main scan direction x and in a sub scan direction y before correction, and processed_value (x, y) shows a pixel value in a main scan direction x and in a sub scan direction y after correction.

FIG. 4E is a bit map image after the tone value conversion is performed to the forward and backward pixels in a sub scan direction according to the image correction parameter of FIG. 4D. FIG. 4F is an exposure image of the bit map image subjected to the tone value conversion on the image carrier, where the inclination of the main scan line is cancelled out to form horizontal straight lines.

The above explanation is made of the image correcting method. It should be noted that the correcting method explained herein is the method at the time of forming a normal image, and at the time of position deviation detecting, a method different from this method is used as described later.

Next, a position deviation detection operation in the present embodiment will be explained.

Figure 5:
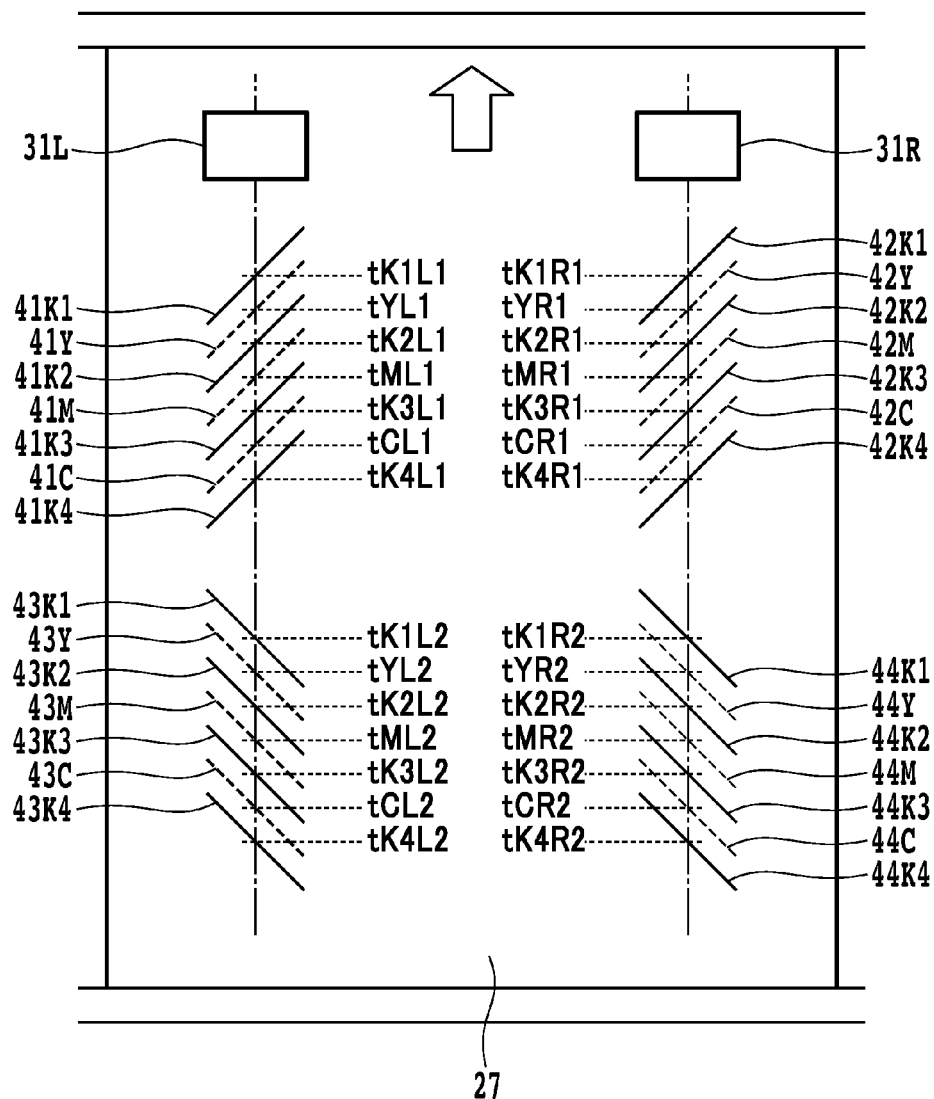
FIG. 5 is a diagram showing an example of a pattern for position deviation detection formed on a transfer material carrier.

Patterns for position deviation detection (hereinafter, called detection pattern or pattern) as shown in FIG. 5 are formed on the intermediate transfer belt 27, which are read by the image detecting sensors 31L and 31R provided at both sides of the intermediate transfer belt 27 to detect a position deviation amount of each color. Such position deviation detection operation is, at the time of estimating that the position deviation becomes larger than at the previous position deviation detection, performed according to the instruction of the CPU 313 or the CPU 314. The timing that the position deviation is estimated to be larger includes, for example, after a predetermined number of papers are printed immediately after activation, a predetermined time elapse after the activation time, and at a change of temperature or humidity. At 41 to 94 in FIG. 5 are denoted patterns for detecting position deviation amounts in a main scan direction and in a sub scan direction. In this example, the pattern has an inclination of 45 degrees, K1 to K4 show a reference color (black), and Y, M and C (Y: yellow, M: magenta and C: cyan) show detection colors. A deviation amount from the reference color is defined as a position deviation amount in each detection color. The patterns 41 and 93 are detected by the image detecting sensor 31L and the patterns 42 and 44 are detected by the image detecting sensor 31R. In addition, tYL1, tML1, tCL1, tKL1, tK1L1, tK2L1, tK3 L1 and tK4L1 show detection timings of the pattern 41, and tYR1, tMR1, tCR1, tK1R1, tK2R1, tK3R1 and tK4R1 show detection timings of the pattern 42. Further, tYL2, tML2, tCL2, tK1L2, tK2L2, tK3L2 and tK4L2 show detection timings of the pattern 43, and tYR2, tMR2, tCR2, tK1R2, tK2R2, tK3R2 and tK4R2 show detection timings of the pattern 44. An arrow shows a moving direction of the intermediate transfer belt 27. Therefore, in FIG. 5 the sub scan direction corresponds to a vertical direction which is the same as or the opposite to the arrow direction, and the main scan direction corresponds to a horizontal direction. The respective patterns of the pattern 41 are arranged in equal intervals, and the respective patterns of the patterns 42 to 44 are likewise arranged in equal intervals. An interval in detection timing between the patters 41 and 43 and an interval in detection timing between the patters 42 and 44 in an ideal state without position deviation are defined as Tdt. That is, a difference tK1L2−tK1L1 between detection timings tK1L1 and tK1L2 of the patterns 41K1 and 43K1 is Tdt in an ideal state without position deviation. An interval between other detection timings is the same. The details of the position deviation amount calculating method in the present embodiment using these values will be described later.

[Flow Chart for Switching Image Correcting Method]

Figure 6:
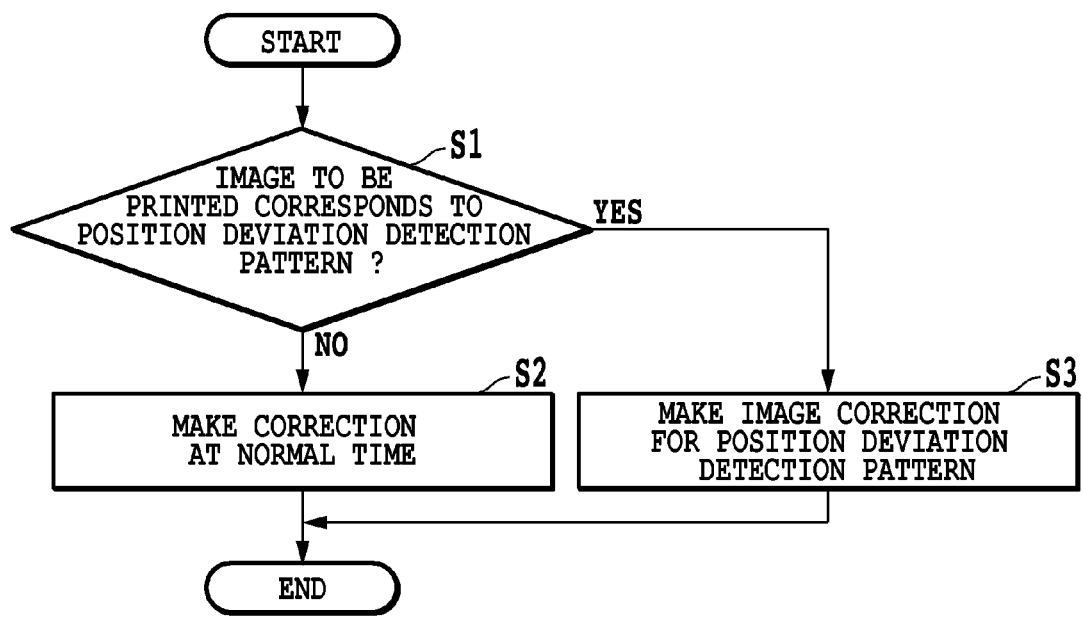
FIG. 6 is a flow chart for switching processing of an image correcting method.

Next, an image correcting method of a position deviation detection pattern in the image correcting unit 315 will be explained. At the time of forming the position deviation detection pattern, correction of image data different from that at the time of forming a normal image is made. FIG. 6 is a flowchart showing a switching determination of the image correcting method and shows the processing by the image correcting unit 315. Herein, the switching determination is performed to all the image formation.

Hereinafter, the switching determination will be explained with reference to FIG. 6.

First, the CPU 313 determines whether or not an image to be printed is a position deviation detection pattern before forming the image (S1). For example, in a case where information showing the position deviation detection pattern is included in an image signal transmitted from the host 301, it is determined that the image to be printed is the position deviation detection pattern. The CPU 313, in a case where the image to be printed is not the position deviation detection pattern, uses an image correcting method at the time of forming a normal image, in the image correcting unit 315 (S2). The CPU 313, in a case where the image to be printed is the position deviation detection pattern, uses an image correcting method at the time of forming a position deviation detection pattern, in the image correcting unit 315 (S3). The image correcting method is thus switched.

[Image Correcting Method at the Time of Detecting Position Deviation]

Next, a part of an image correcting method at the time of forming a position deviation detection pattern which is different from that at the time of forming a normal image will be explained. The different part is composed of the two following matters. The first is not to make an image position correction for less than one pixel in a sub scan direction at the time of forming a position deviation detection pattern.

In the image correcting method at the time of forming a normal image, smoothing of the image is performed using a small pixel of less than one dot at tone value converting. Therefore, in some cases, a small pixel (dot of a half tone) unstable in an electronic photograph system is formed near an edge of a line and the edge portion of the line does not reach a density to be intended. Accordingly, at the time of forming a detection pattern, an image correction of the detection pattern is made without carrying out the smoothing to form a stable pattern, thus making it possible to detect the edge with high accuracy.

Figure 7:
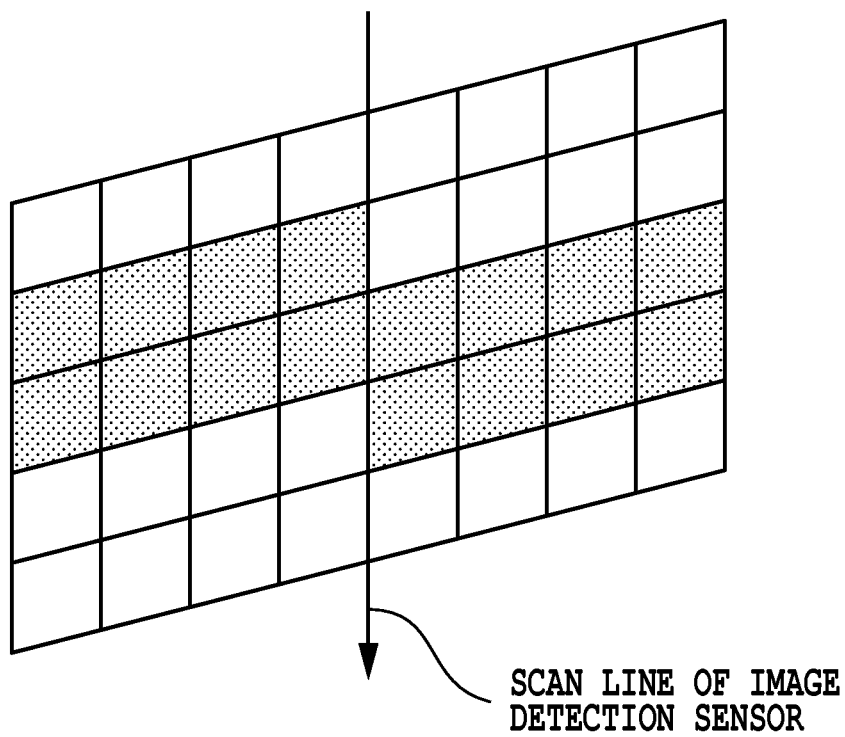
FIG. 7 is a diagram explaining the event that a step of a line is generated in a case of making an image correction without smoothing.

The second is to execute the processing of not generating a step in a sub scan direction. Here, in a case of making an image correction simply without smoothing, one or more steps each having one dot may be generated in a horizontal line as shown in FIG. 7. In a case where the step is generated in the vicinity of a scan line in the image detecting sensor, there is a possibility that the image detecting sensor 31 reads out this step to be incapable of accurately detecting the position deviation. For example, there is a possibility that it can not be accurately detected whether the deviation causing this step is due to deviation of an image to the upward side or due to deviation of the image to the lower side.

Figure 8:
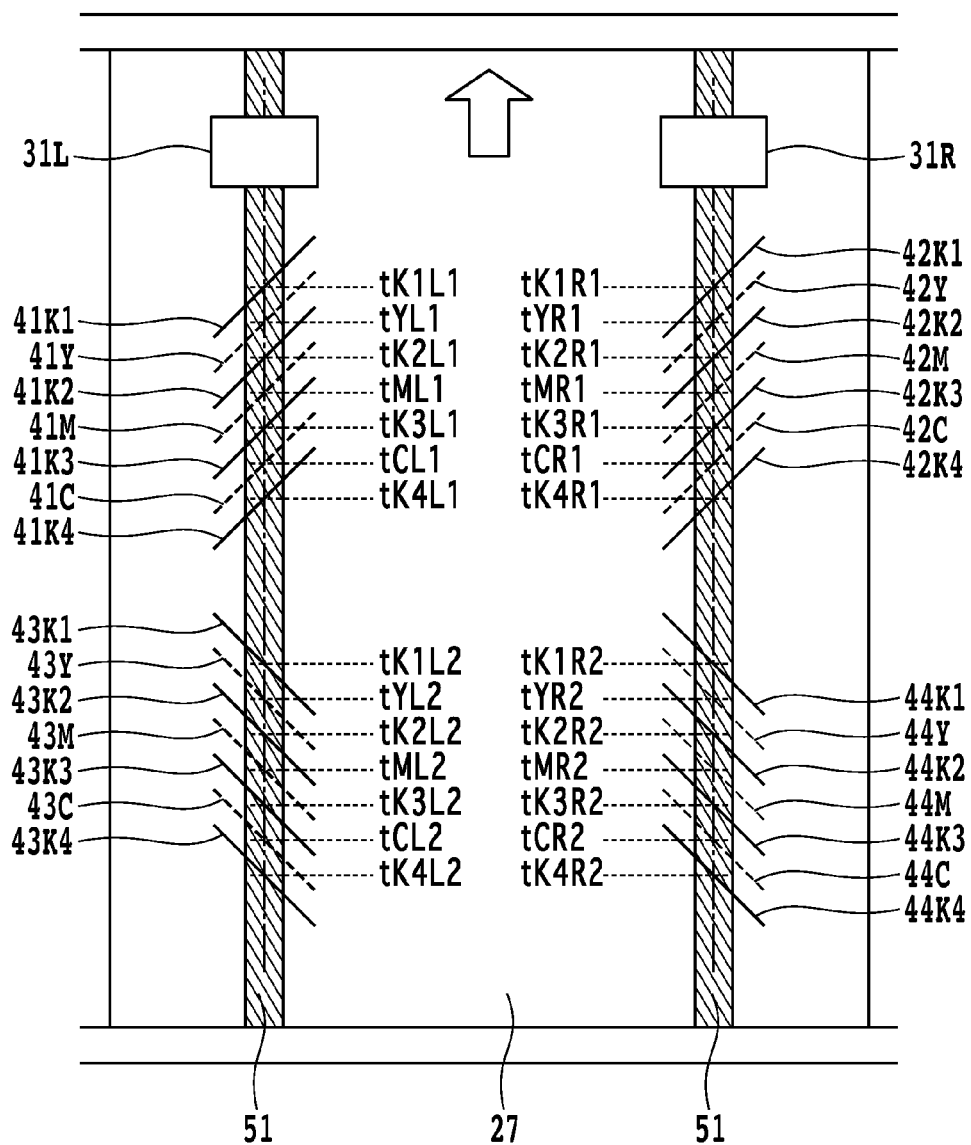
FIG. 8 is a diagram explaining a position relation between a detection pattern and a step restricting region.

Therefore, the present embodiment is, as shown in FIG. 8, configured such that a step restricting region 51 is provided in the vicinity of the scan line in the image detecting sensor 31 to prevent a step of the line from being generated within the step restricting region 51. In an ideal situation where the position deviation is not generated, a portion of the image detecting sensor 31 in the vicinity of the scan line corresponds to a center portion of the detection pattern in a main scan direction. Hereinafter, an image correcting method at the time of forming the detection pattern incorporating the two above points therein will be explained with reference to FIGS. 9A to 9E.

[State of Detection Pattern to be Formed]

FIG. 9A is an image of a scan line having an inclination rising toward the top right, and specially the image can correspond to the pattern for detection of tY1L1 shown in FIG. 8, for example. Here, an inclination of one dot per four dots in a main scan direction is generated in the same way as in FIG. 4A. That is, FIG. 9A shows a state where the scan line of tY1L1 rising toward the top right is furthermore inclined to the top right.

FIG. 9B is a bitmap image example of a horizontal straight line before correction and expresses a line having a two-dot width. The detection pattern is, as shown in FIG. 8, a pattern having an inclination angle of 45 degrees, but herein, is explained as the horizontal straight line for simple explanation.

FIG. 9C is a correction bit map image formed by correcting the bit map image of FIG. 9B for cancelling out a position deviation due to an inclination of the scan line of FIG. 9A. For realizing the correction image in FIG. 9C, image data of the forward and backward pixels in a sub scan direction is adjusted. It should be noted that the adjustment of the image data herein indicates adjustment of coordinate correction and the image tone value in the aforementioned bit map image. At the time of forming the detection pattern, smoothing processing to the pixel less than one pixel is not executed.

FIG. 9D is table expressing a relation between a position deviation correction amount Δy and a tone value conversion parameter.

In the table of FIG. 9D, pixels on which marks are attached in a line of the step restriction express pixels within the step restricting region 51. The step restricting region 51 is a region in the vicinity of the scan line in the image detecting line sensor 31. The step restricting region 51 is calculated by information of a location position and a detection range of the image detecting sensor 31, and the like. As shown in FIG. 9D, a plurality of pixel positions of the pattern for detection in a main scan direction correspond to the step restricting region 51. In addition, k expresses an integral component (truncate fractions below decimal point) of the position deviation correction amount Δy, and k' expresses a correction amount in one pixel unit in a sub scan direction. The pixel is offset in one pixel unit in a sub scan direction in accordance with the correction amount k'. Different from the image correction at the time of forming a normal image, a value of k is not directly used as the correction amount and is designed not to change within the step restricting region. That is, within the step restricting region, coordinate correction of image data in a sub scan direction is not made in a predetermined pixel position (first predetermined position) in a main scan direction and the coordinate correction is made other than the predetermined pixel position (second predetermined position outside of the step restricting region).

The reason that the value of k' outside of the step restricting region is permitted to change, that is, the coordinate correction of the image data is made outside of the step restricting region is that there are some cases where a pattern overlaps forward and backward patterns adjacent thereto when the coordinate correction is configured to be not made to all the detection patterns. This matter will be in detail explained with reference to FIG. 9F and FIG. 9G described later.

FIG. 9E is a bit map image formed by performing position adjustment to forward and backward pixels in a sub scan direction according to the image correction parameter in FIG. 9D. A hatched portion in FIG. 9E expresses the step restricting region 51. Since the image correcting method is different from that at the time of forming the normal image, even if the inclination amount is the same, the correction result in this image is different from that in FIG. 4E.

FIG. 9F shows a state of pattern formation in a case where any correction is not made at all to original image data of a pattern for detecting a position amount. That is, it shows a state of the pattern formation in a case smoothing processing of less than one pixel and offset processing in one pixel unit are not executed. In this case, when a degree of the image inclination or the image curve is large, the forward and backward patterns in a sub scan direction overlap from each other. In addition, when the deviation in a main scan direction is large, there are some cases where the overlapped portion is detected by the image detecting sensor and as a result an erroneous position deviation correction is made. In an example of FIG. 9F, a detection pattern is originally formed such that a detection timing tYL1 of a detection color is detected between tK1L1 and tK2L1 of detection timings of a reference color. However, in the right side of FIG. 9F, the detection timing tYL1 of the detection color is out of a region between the timings of the reference color and therefore the position deviation from another reference color (not shown) is in error detected.

On the other hand, FIG. 9G shows a case where, in regard to original image data of a pattern for detecting a position deviation amount, a correction is not made to image data corresponding to the step restricting region 51 and a correction is made to image data corresponding to a pattern outside of the step restricting region 51. That is, it shows, as described above, an example where the smoothing processing of less than one pixel is not executed and the offset processing in one pixel unit is executed to a region other than the step restricting region 51. The step restricting region 51 is a region in the vicinity of the scan line of the image detecting sensor 31, which is smaller as compared to a pattern of an entire image to be formed (white data is included in a portion in which the pattern is not formed, on the image data). Therefore, in regard to regions other than the step restricting region 51, execution of offset processing in one pixel unit prevents detection patterns from overlapping. On the other hand, in regard to the step restricting region 51, non-execution of the offset processing can prevent generation of a step within the step restricting region 51 to prevent calculation of erroneous position deviation.

It should be noted that actual offset processing may not be executed in regard to the portion where the detection pattern is not formed. That is, the calculation itself for correcting the position deviation is performed, but in regard to the portion where the detection pattern is not formed, the processing of actually offsetting the image may be omitted.

It should be noted that when the position deviation in a main scan direction is largely generated, there are some cases where the pattern is formed in a deviated place in the main scan direction and the image detecting sensor 31 detects a pattern outside of the formation step restricting region 51. That is, it is estimated that there is a case where the image to be formed in the step restricting region 51 can not be formed in the region to be expected. In this case, if a pattern for detecting a position deviation amount is formed as shown in FIG. 9G, since there is a possibility that a detection region of the image detecting sensor 31 is outside of the step restricting region 51 in of FIG. 9G, there occurs a possibility that the image detecting sensor 31 detects the step explained in FIG. 7. However, as compared to a case of forming the pattern as shown in FIG. 9F, it can be avoided to detect at least a portion where position deviation amount detection patterns of different colors overlap to obtain the better detection result than in a case of FIG. 9F. It should be noted that a value of k is substantially the same as a value of k' outside of the step restricting region. A case where these values are not the same is a case where due to restriction of hardware that only the offset processing corresponding to one line in a sub scan direction by one time of the offset processing can be allowed to be executed, a plurality of times of the offset processing in a sub scan direction is not executed within the step restricting region. In this case, there are some cases where the value of k are not the same as the value of k' outside of the step restricting region. However, since the step restricting region is a small region in the image and the number of times by which the offset processing is not executed is only up to several times, there is consequently a low possibility that the position deviation amount detection patterns of different colors overlap.

In this way, the pattern is formed on the intermediate transfer belt 27 based upon the image data of the pattern for position deviation detection subjected to the image correction at the time of forming the position deviation detection pattern shown in FIGS. 9A to 9E, by the electronic photograph construction explained in FIG. 1.

[Difference in Detection Accuracy of Detection Pattern]

Next, an explanation will be made of a difference in detection accuracy between detection patterns in a case where an image correcting method at the time of forming a normal image is compared with an image correcting method at the time of forming a position deviation detection pattern to form the detection patterns by the respective methods.

Figure 10B:
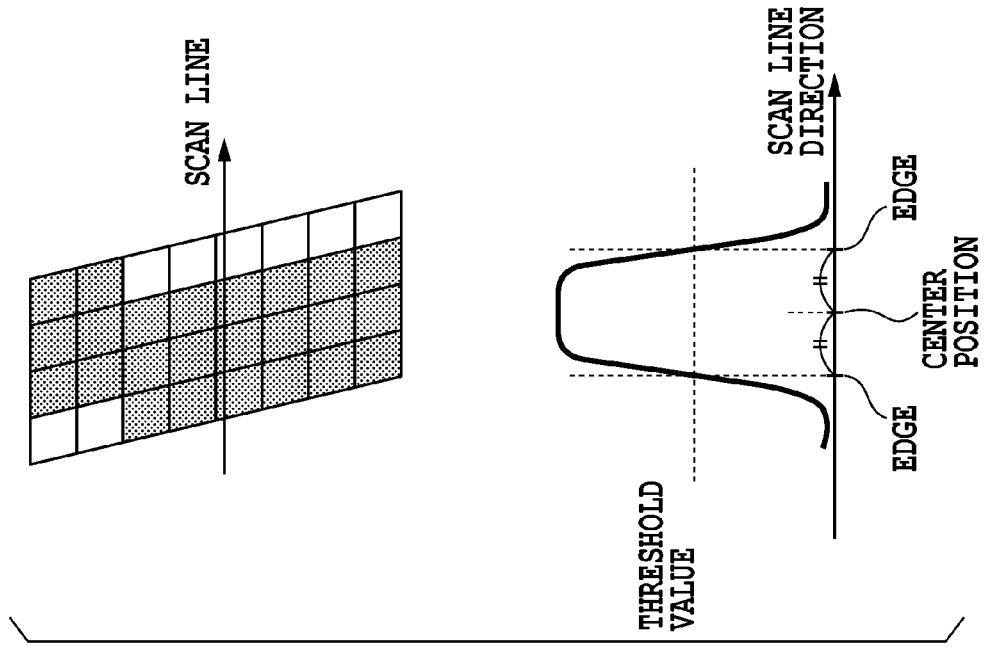
FIGS. 10A and 10B are diagrams explaining a difference in position deviation detection accuracy by each image correcting method.
Figure 10A:
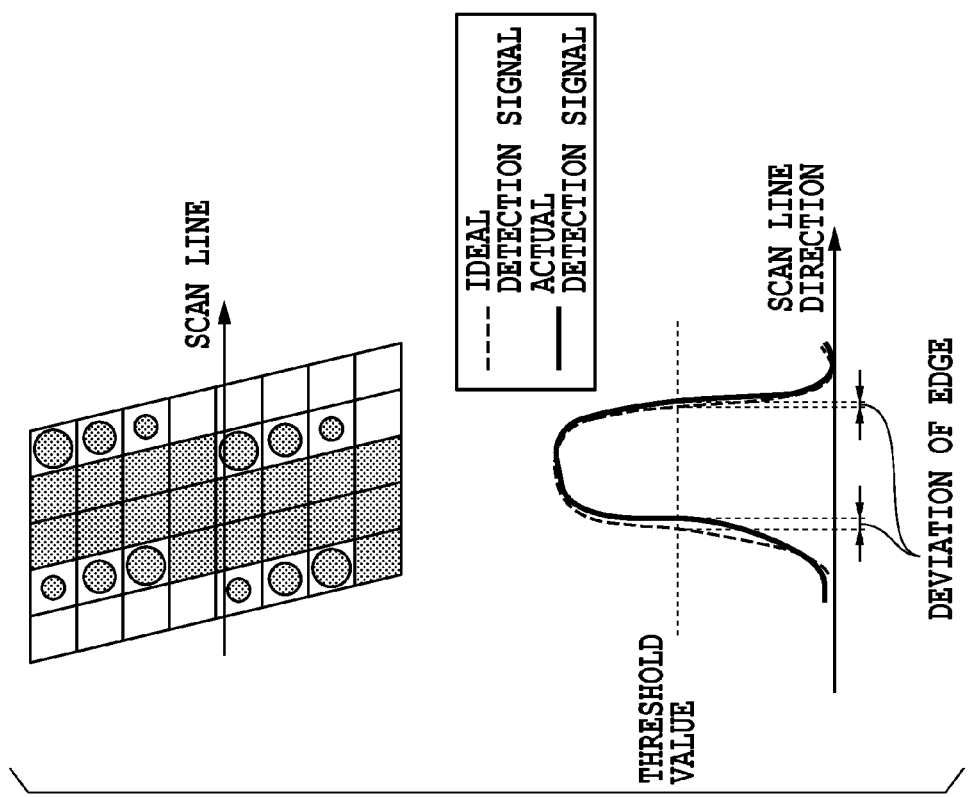
Figure 11A:
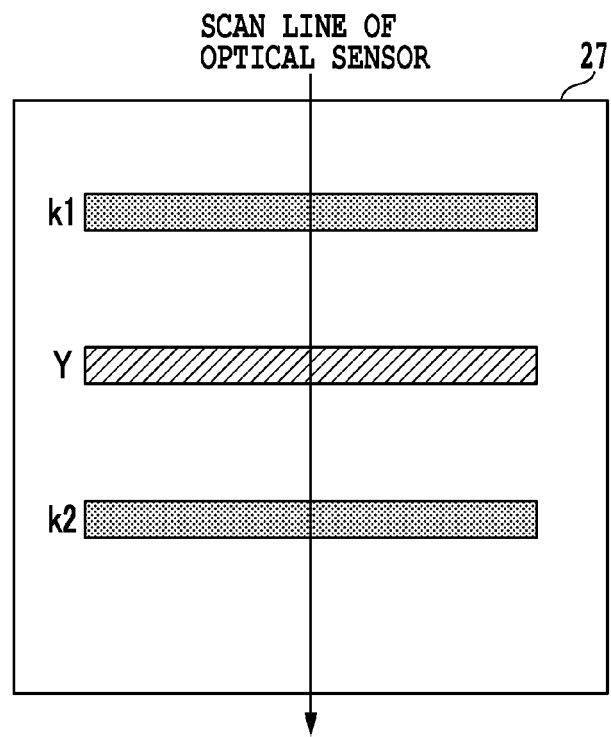
FIGS. 11A to 11C are diagrams explaining position deviation detection between patterns in two colors in a sub scan direction.
Figure 11B:
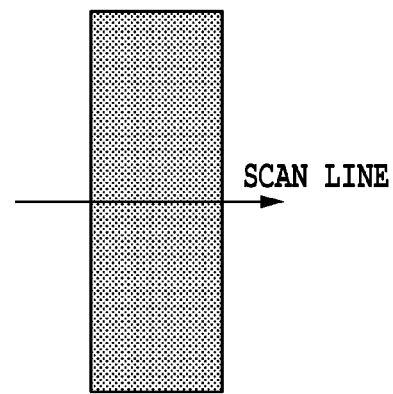
Figure 11C:
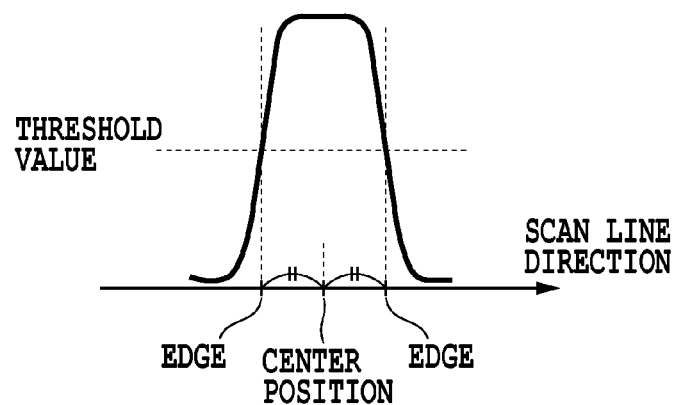
Figure 12A:
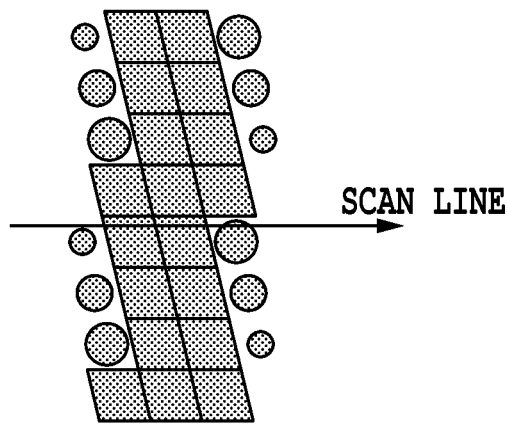
FIGS. 12A and 12B are diagrams showing a detection signal in a case of detecting a horizontal line after position deviation correction by an optical sensor.
Figure 12B:
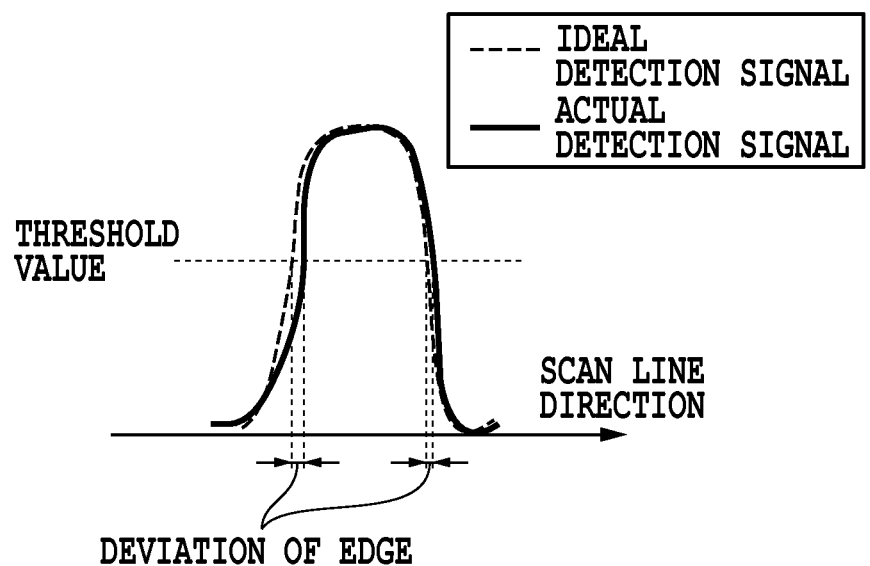

FIG. 10A and FIG. 10B are tables each expressing a state of a line in a case of making an image correction to a horizontal line for printing and a detection signal in a case of detecting the line by the image detecting sensor 31. FIG. 10A shows the image correction at the time of normal image forming and FIG. 10B shows the image correction at the time of position deviation detection pattern forming. In addition, as shown in the figures, timings where a predetermined threshold value and a signal intersect are defined as detection timings of edges in a line and a detection timing of the line is defined as an average value of the detection timings at both ends of the line (detection timing at a center position).

In a case of FIG. 10A, since smoothing is performed in an edge portion of the line, an unstable small pixel of less than one pixel is used. In consequence, the edge portion becomes unstable and the edge is detected out of an ideal signal. In FIG. 10B, since the smoothing is not performed, the edge portion is stable as compared to FIG. 10A and an error at edge detecting becomes smaller. Accordingly, since detection accuracy of the line is improved in a case of FIG. 10B as compared to a case of FIG. 10A, it is possible to detect the detection pattern more accurately.

[Calculation of Position Deviation Amount]

Figure 14:
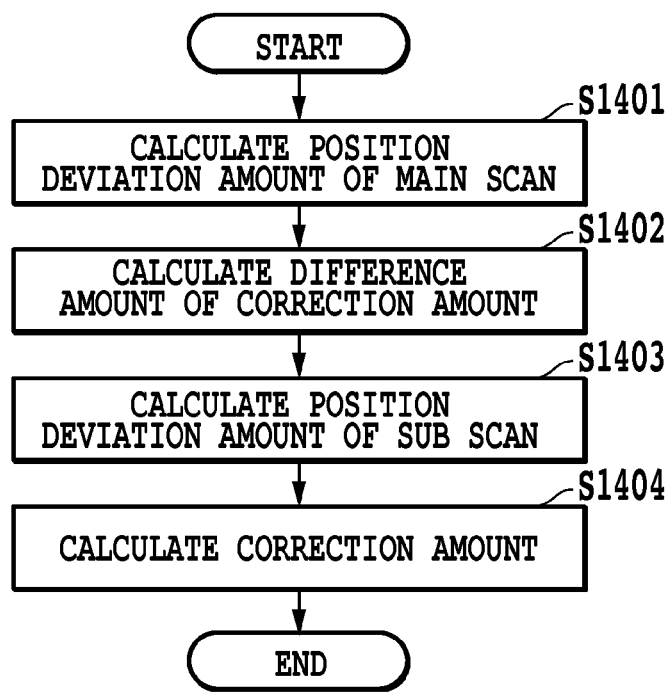
FIG. 14 is a flow chart for calculation processing of the position deviation amount.

The calculating method of the position deviation amount in the present embodiment will be explained with reference to a flow chart in FIG. 14.

<Step S1401>

In step S1401, the CPU 313 calculates a position deviation amount in regard to a main scan direction. In regard to the main scan direction, position deviation amounts of each color at both sides of the intermediate transfer belt detected in a detection pattern are as follows.

$$\Delta sYL = v \times (tYL1 - tYL2)$$

$$\Delta sYR = v \times (tYR1 - tYR2)$$

$$\Delta sML = v \times (tML1 - tML2)$$

$$\Delta sMR = v \times (tMR1 - tMR2)$$

$$\Delta sCL = v \times (tCL1 - tCL2)$$

$$\Delta sCR = v \times (tCR1 - tCR2)$$

From the above, average position deviation amounts $\Delta sY$, $\Delta sM$ and $\Delta sC$ of yellow, magenta and cyan in a main scan direction are as follows.

$$\Delta sY = (\Delta sYL + \Delta sYR)/2$$

$$\Delta sM = (\Delta sML + \Delta sMR)/2$$

$$\Delta sC = (\Delta sCL + \Delta sCR)/2$$

In addition, a value for correction of a main scan scale factor is also calculated. The correction of the main scan scale factor is to correct a scale factor in a main scan direction by performing a minute adjustment of a frequency in an image data signal 207 (speeding up a frequency in a case where a scan width is long) to change a length of a scan line. A system of the position deviation correction in a main scan direction is a well-known matter, and an explanation of the details in regard to the scale factor in a main scan direction herein is omitted.

<Step S1402>

In step S1402, the CPU 313 calculates a difference amount between an ideal correction amount and an actual correction amount for each detection pattern. As shown in FIG. 9D, a difference is generated between the position deviation correction amount $\Delta y$ and the actual correction amount k' in the image correction at the time of position deviation detection pattern forming. By calculating $\Delta y - k'$ at a sensor position, it is possible to calculate the difference amount of this correction amount (amount which is not corrected). Use of this value enables the position deviation amount in a sub scan direction to be calculated with higher accuracy. That is, it is possible to calculate the position deviation amount in a sub scan direction with higher accuracy by using the value which is not used for actual correction for calculation of the position deviation amount (since the calculation of the position deviation amount in a main scan direction has no relation to the position deviation amount in a sub scan direction, it is not necessary to use the difference amount of this correction amount). It should be noted that since a difference amount in the correction amounts of the detection patterns the sensor for which is the same in the same color is also the same since $\Delta y$ and k' have the same value.

A difference amount $\Delta Y\_DIF\_L$ in correction amounts of marks 41Y and 43Y, a difference amount $\Delta Y\_DIF\_R$ in correction amounts of marks 42Y and 44Y, and a difference amount $\Delta M\_DIF\_L$ in correction amounts of marks 41M and 43M are determined according to the following formulas. A difference amount ΔM_DIF_R in correction amounts of marks 42M and 44M, a difference amount ΔC_DIF_L in correction amounts of marks 41C and 43C, and a difference amount ΔC_DIF_R in correction amounts of marks 42C and 44C are determined according to the following formulas. In addition, a difference amount ΔK_DIF_L in correction amounts of marks 41K1 to 41K4 and 43K1 to 43K4 and a difference amount ΔK_DIF_R in correction amounts of marks 42K1 to 42K4 and 44K1 to 44K4 are determined according to the following formulas.

$$\Delta Y\_DIF\_L = \Delta yY\_L - k'Y\_L$$

$$\Delta Y\_DIF\_R = \Delta yY\_R - k'Y\_R$$

$$\Delta M\_DIF\_L = \Delta yM\_L - k'M\_L$$

$$\Delta M\_DIF\_R = \Delta yM\_R - k'M\_R$$

$$\Delta C\_DIF\_L = \Delta yC\_L - k'C\_L$$

$$\Delta C\_DIF\_R = \Delta yC\_R - k'C\_R$$

$$\Delta K\_DIF\_L = \Delta yK\_L - k'K\_L$$

$$\Delta K\_DIF\_R = \Delta yK\_R - k'K\_R$$

Here, ΔyY_L is a position deviation correction amount of yellow in a main scan position of the image detecting sensor 31L. k'Y_L is an actual correction amount of yellow in a main scan position of the image detecting sensor 31L. ΔyY_R and k'Y_R respectively express a position deviation correction amount and an actual correction amount of yellow in a main scan position of the image detecting sensor 31R. ΔyM_L and k'M_L respectively express a position deviation correction amount and an actual correction amount of magenta in a main scan position of the image detecting sensor 31L. ΔyM_R and k'M_R respectively express a position deviation correction amount and an actual correction amount of magenta in a main scan position of the image detecting sensor 31R. ΔyC_L and k'C_L respectively express a position deviation correction amount and an actual correction amount of cyan in a main scan position of the image detecting sensor 31L. ΔyC_R and k'C_R respectively express a position deviation correction amount and an actual correction amount of cyan in a main scan position of the image detecting sensor 31R. ΔyK_L and k'K_L respectively express a position deviation correction amount and an actual correction amount of black in a main scan position of the image detecting sensor 31L. ΔyK_R and k'K_R respectively express a position deviation correction amount and an actual correction amount of black in a main scan position of the image detecting sensor 31R. It should be noted that the main scan position of the sensor position uses a value in consideration of an influence of a main scan scale factor strain of the position deviation amount in a main scan direction found in step S1401.

<Step S1403>

In step S1403, the CPU 313 calculates a position deviation difference amount of each color at both sides of the intermediate transfer belt detected in a detection pattern in regard to a sub scan direction.

First, based upon the corrected detection timing of the reference color, a deviation of the corrected detection timing in the detection color is found. Deviations ΔYL1, ΔYR1, ΔYL2, and ΔYR2 in detection timings of marks 41Y to 44Y are determined according to the following formulas. In addition, deviations ΔML1, ΔMR1, ΔML2, and ΔMR2 in detection timings of marks 41M to 44M and deviations ΔCL1, ΔCR1, ΔCL2, and ΔCR2 in detection timings of marks 41C to 44C are determined according to the following formulas.

$$\Delta YL1 = tYL1 - (tK1L1 + tK2L1)/2$$

$$\Delta YR1 = tYR1 - (tK1R1 + tK2R1)/2$$

$$\Delta YL2 = tYL2 - (tK1L2 + tK2L2)/2$$

$$\Delta YR2 = tYR2 - (tK1R2 + tK2R2)/2$$

$$\Delta ML1 = tML1 - (tK2L1 + tK3L1)/2$$

$$\Delta MR1 = tMR1 - (tK2R1 + tK3R1)/2$$

$$\Delta ML2 = tML2 - (tK2L2 + tK3L2)/2$$

$$\Delta MR2 = tMR2 - (tK2R2 + tK3R2)/2$$

$$\Delta CL1 = tCL1 - (tK3L1 + tK4L1)/2$$

$$\Delta CR1 = tCR1 - (tK3R1 + tK4R1)/2$$

$$\Delta CL2 = tCL2 - (tK3L2 + tK4L2)/2$$

$$\Delta CR2 = tCR2 - (tK3R2 + tK4R2)/2$$

A position deviation amount of each color at both sides of the intermediate transfer belt detected in a detection pattern is found by the deviation of the above detection timing according to the following formulas.

$$\Delta pYL\_MEASURE = v \times (\Delta YL1 + \Delta YL2)/2$$

$$\Delta pYR\_MEASURE = v \times (\Delta YR1 + \Delta YR2)/2$$

$$\Delta pML\_MEASURE = v \times (\Delta ML1 + \Delta ML2)/2$$

$$\Delta pMR\_MEASURE = v \times (\Delta MR1 + \Delta MR2)/2$$

$$\Delta pCL\_MEASURE = v \times (\Delta CL1 + \Delta CL2)/2$$

$$\Delta pCR\_MEASURE = v \times (\Delta CR1 + \Delta CR2)/2$$

Herein, v is a moving speed of the intermediate transfer belt 27.

This value is a value including an error corresponding to a difference amount of a correction amount to an original position deviation amount since the difference amount of the correction amount calculated in step S1402 is not considered. In consequence, considering the difference amount of the correction amount calculated in step S1402, actual position deviation amounts of each color are as follows.

$$\Delta pYL = \Delta pYL\_MEASURE + \Delta Y\_DIF\_L - \Delta K\_DIF\_L$$

$$\Delta pYR = \Delta pYR\_MEASURE + \Delta Y\_DIF\_R - \Delta K\_DIF\_R$$

$$\Delta pML = \Delta pML\_MEASURE + \Delta M\_DIF\_L - \Delta K\_DIF\_L$$

$$\Delta pMR = \Delta pMR\_MEASURE + \Delta M\_DIF\_R - \Delta K\_DIF\_R$$

$$\Delta pCL = \Delta pCL\_MEASURE + \Delta C\_DIF\_L - \Delta K\_DIF\_L$$

$$\Delta pCR = \Delta pCR\_MEASURE + \Delta C\_DIF\_R - \Delta K\_DIF\_R$$

The difference amount is a value of less than one line in a case where k and k' explained in FIG. 9D are the same. In this case, since it is a difference amount to black, the difference amount is a difference amount corresponding to two pixels at a maximum. For example, in a case where one pixel is 600 dpi, since two pixels become about 80 μm, the difference amount is the cause of a large position deviation. Even if one pixel has more than the above resolution, there is no change in a possibility that the difference amount is the cause of the position deviation. It is possible to reduce the position deviation amount due to the difference amount between an ideal correction amount and an actual correction amount to be zero with the above calculation.

Based upon the actual position deviation amount at each sensor position, calculations of an offset position deviation amount and an inclination position deviation amount in a sub scan direction are carried out.

Figure 13:
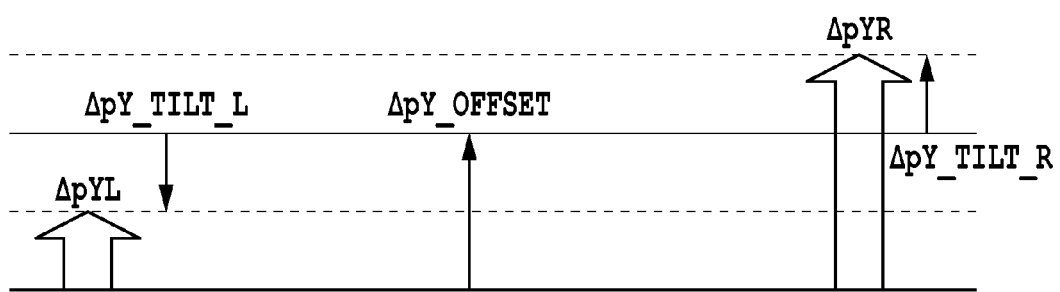
FIG. 13 is a diagram explaining a position deviation amount in a sub scan direction.

A relation between the offset position deviation amount and the inclination position deviation amount in a sub scan direction is shown in FIG. 13 by taking yellow as an example. ΔpY_OFFSET is an offset position deviation amount in a sub scan direction, ΔpY_TILT_L is an inclination position deviation amount in a sub scan direction in the left side, and ΔpY_TILT_R is an inclination position deviation amount in a sub scan direction in the right side.

Specially offset position deviation amounts ΔpY_OFFSET, ΔpM_OFFSET and ΔpC_OFFSET of yellow, magenta and cyan in a sub scan direction are found according to the following formulas.

$$\Delta pY\_OFFSET=(\Delta pYL+\Delta pYR)/2$$

$$\Delta pM\_OFFSET=(\Delta pML+\Delta pMR)/2$$

$$\Delta pC\_OFFSET=(\Delta pCL+\Delta pCR)/2$$

In addition, inclination position deviation amounts ΔpY_TILT_L, ΔpM_TILT_L and ΔpC_TILT_L of yellow, magenta and cyan in a sub scan direction in the left side are found according to the following formulas.

$$\Delta pY\_TILT\_L=\Delta pYL-\Delta pY\_OFFSET$$

$$\Delta pM\_TILT\_L=\Delta pML-\Delta pM\_OFFSET$$

$$\Delta pC\_TILT\_L=\Delta pCL-\Delta pC\_OFFSET$$

In addition, inclination position deviation amounts ΔpY_TILT_R, ΔpM_TILT_R and ΔpC_TILT_R of yellow, magenta and cyan in a sub scan direction in the right side are found according to the following formulas.

$$\Delta pY\_TILT\_R=\Delta pYR-\Delta pY\_OFFSET$$

$$\Delta pM\_TILT\_R=\Delta pMR-\Delta pM\_OFFSET$$

$$\Delta pC\_TILT\_R=\Delta pCR-\Delta pC\_OFFSET$$

<Step S1404>

In step S1404, the CPU 313 calculates a correction amount of the position deviation by the detected position deviation amounts in a main scan direction and in a sub scan direction. Correction of the inclination position deviation amount in a sub scan direction is made by the coordinate correction of the bit map image and the correction of the position deviation by the adjustment of the image tone value explained in FIG. 3 and in FIGS. 4A to 4F. The offset position deviation amount in a sub scan direction and the position deviation correction in a main scan direction will be explained by taking a position deviation correction to yellow as an example. Image forming timing in a sub scan direction is adjusted based upon an offset position deviation amount ΔpY_OFFSET in a sub scan direction. In this case, only the correction of the sub scan offset in one pixel unit can be made, but the correction of the sub scan offset for less than one pixel can be realized by using a system of the correction of the inclination position deviation amount. This can be realized by generating the correction bit map image in consideration of a sub scan offset component less than one pixel. Writing timing of the scan line is adjusted based upon an average position deviation amount ΔsY in a main scan direction. In addition, a length of a scan line is changed by performing a minute adjustment of a frequency in an image data signal 207 (speeding up a frequency in a case where a scan width is long) based upon ΔsYR−ΔsYL to correct a scale factor in a main scan direction. It should be noted that in a case where an error exists in the main scan direction scale factor, the writing position is calculated not only based upon ΔsY but also based upon a changing amount of an image frequency which has changed with the main scan direction scale factor correction. The correction is made similarly to magenta and cyan. It should be noted that a system of the corrections in the offset position deviation amount in a sub scan direction and the position deviation in a main scan direction based upon the detection result of the pattern for position deviation detection is a well-known matter, and an explanation of the details is omitted herein. The subsequent image corrections are made based upon the correction values calculated herein in the image correcting unit 315.

As described above, the image data is controlled not to be subjected to the smoothing processing and also not to change the correction amount within the step restricting region at detection pattern forming, and thereby it is possible to restrict the step in the line and detect the detection pattern with accuracy. In addition, this control can prevent the event that the position deviation amount detection patterns between different colors overlap each other to perform the completely erroneous position deviation detection, thus performing more stable position deviation detection.

In addition, by using the difference value of the correction amount corresponding to the amount which is not subjected to the smoothing processing (difference amount between the ideal correction amount and the actual correction amount) at detection pattern forming, at the position deviation amount calculation, it is possible to perform the position deviation amount calculation with higher accuracy. Since the correction accuracy is improved due to calculating the correction value using it, it is possible to reduce the position deviation amount after correction.

[Modification 1]

The above explanation is made in such a manner that the image correction in a sub scan direction is not made for the step restricting region 51 alone, but the target of non-image correction in a sub scan direction is not limited thereto. For example, in a case where a degree of the position deviation caused by the mechanical factor is not as large as for the patterns for detection to overlap from each other, the image correction in a sub scan direction may not be made to all the patterns for position deviation detection.

[Modification 2]

The explanation relating to FIG. 8 and FIGS. 9A to 9S is made such that the image data of the pattern for position deviation detection is produced by the image correcting unit 315. However, the production of the image data is not limited thereto. For example, it may be configured such that the image itself which is in advance subjected to the image processing explained in FIGS. 9A to 9E is in advance stored in an involatile memory (not shown), and the image data is read out from the involatile memory at the time of forming a pattern for position deviation detection to form the pattern for position deviation detection. In this case, for example, the inclination or the curve of the image as explained in FIG. 3 is measured by a measurement tool in a factory, and image data having a reverse characteristic to the measured inclination or curve (image data after correction explained in FIGS. 9A to 9E) may be stored in an involatile memory provided in a video controller 302 (not shown). It should be noted that since the processing subsequent to the processing where the image data for the pattern for position deviation detection which is in advance subjected to the image correction is readout from the involatile memory and the pattern for position deviation detection is formed using it is the same as in the above embodiment, the detailed explanation herein is omitted.

[Modification 3]

In the above explanation, an explanation is made of a case where the image correction for less than one pixel in a sub scan direction and the image correction in a pixel unit in a sub scan direction are made, as an example of a case where the image correction in a sub scan direction is made at each position of the image data in a main scan direction to make the image position correction in a sub scan direction. However, for example, even in an image forming apparatus for making only the image correction in a pixel unit in a sub scan direction, a predetermined effect can be obtained in terms of detection accuracy improvement of the pattern for position deviation detection.

[Modification 4]

The above explanation is made of a case where the image correction of the pattern for position deviation detection (coordinate correction in one pixel unit in a sub scan direction or the image position correction for less than one pixel in a sub scan direction by adjusting a density of each pixel in a sub scan direction) is made by the controller 302 (image correcting unit 315). However, the image correction is not limited to the configuration of being made by the controller 302. For example, the engine 303 may execute a part of or all of the image correcting processing. In addition, in a case of executing the image correcting processing by any of the controller 302 and the engine 303, the processing may be executed by the CPU 313 or the CPU 314, and a part of or all of the processing may be executed by an ASIC (integrated circuit) without mentioning.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-045679, filed Mar. 2, 2010, which is hereby incorporated by reference herein in its entirety.

What is claimed is:

1. An image processing apparatus comprising:
a correction unit configured to perform a position deviation correction on image data in a sub scanning direction on a basis of a part of correction amount included in a correction amount used for a position deviation correction in a sub scanning direction, the correction amount used for the position deviation correction in the sub scanning direction including the part of correction amount and a remaining correction amount;
a formation unit configured to form an image on a basis of the image data corrected by the correction unit;
a measure unit configured to measure a position deviation amount from a reference of the image formed by the formation unit; and
a deriving unit configured to derive a correction amount on a basis of the position deviation amount measured by the measure unit and the remaining correction amount, wherein the correction amount derived by the deriving unit is used for a subsequent position deviation correction on image data in a sub scanning direction.

2. The image processing apparatus according to claim 1, wherein the image data corresponds to predetermined patterned image data for measuring a position deviation amount of an image.

3. The image processing apparatus according to claim 2, wherein the predetermined patterned image data includes a plurality pieces of image data corresponding respectively to a plurality of process colors,
wherein the formation unit forms a plurality of patterned images corresponding respectively to the plurality of process colors on a basis of the predetermined patterned image data, and
wherein the reference is a patterned image corresponding to a predetermined process color among the plurality of patterned images formed by the formation unit.

4. The image processing apparatus according to claim 1, wherein the correction unit does not perform a position deviation correction on the image data in a sub scanning direction on a basis of the remaining correction amount.

5. The image processing apparatus according to claim 1, wherein the position deviation correction in the sub scanning direction includes a correction for shifting a pixel included in the image data in the sub scanning direction in a pixel unit on a basis of the part of correction amount and a correction for blending a value of a pixel included in the image data with a value of an adjacent pixel on a basis of the remaining correction amount, and
wherein the correction unit performs the correction for shifting on the image data on a basis of the part of correction amount, and does not perform the correction for blending on the image data on a basis of the remaining correction amount.

6. The image processing apparatus according to claim 5, wherein the correction unit,
in a case where the image data corresponds to predetermined patterned image data for measuring a position deviation amount of an image, performs the correction for shifting on the predetermined patterned image data on a basis of the part of correction amount, and does not perform the correction for blending on the predetermined patterned image data on a basis of the remaining correction amount, and
in a case where the image data corresponds to image data generated by a user, performs the correction for shifting on the generated image data on a basis of the part of correction amount and the correction for blending on the generated image data on a basis of the remaining correction amount.

7. The image processing apparatus according to claim 1, wherein the part of correction amount corresponds to a correction amount in a pixel unit, and the remaining correction amount corresponds to a correction amount including a correction amount less than one pixel.

8. The image processing apparatus according to claim 7, wherein the part of correction amount includes a plurality of correction amounts in a pixel unit corresponding to a plurality of pixels included in the image data respectively, wherein the plurality of pixels corresponds to an area of formed image measured by the measure unit, and wherein the correction unit, in a case where the plurality of correction amounts in a pixel unit are different, performs the position deviation correction on the plurality of pixels included in the image data on a basis of same correction amount in a pixel unit.

9. An image processing system, comprising:

a correction unit configured to perform a position deviation correction on image data in a sub scanning direction on a basis of a part of correction amount included in a correction amount used for a position deviation correction in a sub scanning direction, the correction amount used for the position deviation correction in the sub scanning direction including the part of correction amount and a remaining correction amount;

a formation unit configured to form an image on a basis of the image data corrected by the correction unit;

a measure unit configured to measure a position deviation amount from a reference of the image formed by the formation unit; and a deriving unit configured to derive a correction amount on a basis of the position deviation amount measured by the measure unit and the remaining correction amount, wherein the correction amount derived by the deriving unit is used for a subsequent position deviation correction on image data in a sub scanning direction.

10. An image processing method, comprising:

performing a position deviation correction on image data in a sub scanning direction on a basis of a part of correction amount included in a correction amount used for a position deviation correction in a sub scanning direction, the correction amount used for the position deviation correction in the sub scanning direction including the part of correction amount and a remaining correction amount;

forming an image on a basis of the corrected image data;

measuring a position deviation amount from a reference of the formed image; and deriving a correction amount on a basis of the measured position deviation amount and the remaining correction amount, wherein the derived correction amount is used for a subsequent position deviation correction on image data in a sub scanning direction.

11. A non-transitory computer-readable storage medium storing a program which causes a computer to execute an image processing method, the method comprising:

performing a position deviation correction on image data in a sub scanning direction on a basis of a part of correction amount included in a correction amount used for a position deviation correction in a sub scanning direction, the correction amount used for the position deviation correction in the sub scanning direction including the part of correction amount and a remaining correction amount;

forming an image on a basis of the corrected image data;

measuring a position deviation amount from a reference of the formed image; and deriving a correction amount on a basis of the measured position deviation amount and the remaining correction amount, wherein the derived correction amount is used for a subsequent position deviation correction on image data in a sub scanning direction.

* * * * *